United States Patent [19]

Ohata

[11] Patent Number: 5,103,413
[45] Date of Patent: Apr. 7, 1992

[54] TRAVEL DETECTING APPARATUS

[75] Inventor: Hiroaki Ohata, Shimada, Japan

[73] Assignee: Yazaki Corporation, Tokyo, Japan

[21] Appl. No.: 554,156

[22] Filed: Jul. 19, 1990

Related U.S. Application Data

[63] Continuation of Ser. No. 253,184, Oct. 4, 1988, abandoned.

[30] Foreign Application Priority Data

Oct. 6, 1987 [JP] Japan .............................. 62-152243[U]

[51] Int. Cl.$^5$ ............................................. G01P 21/02
[52] U.S. Cl. ................................... 364/565; 364/561; 324/166; 324/160; 73/490; 235/95 R; 235/95 C; 377/24; 377/24.1
[58] Field of Search ................ 364/565, 561; 324/160, 324/166; 73/490, 527; 235/95 R, 95 B, 95 C; 377/24, 24.1

[56] References Cited

U.S. PATENT DOCUMENTS

| | | | |
|---|---|---|---|
| 3,780,272 | 12/1973 | Bohner | 364/561 |
| 4,103,332 | 7/1978 | Floyd et al. | 235/95 B |
| 4,140,970 | 2/1979 | Graziano | 324/166 |
| 4,167,699 | 9/1979 | Baker | 364/565 |
| 4,197,585 | 4/1980 | Moorey et al. | 73/490 |

FOREIGN PATENT DOCUMENTS 0221265 4/1985 German Democratic Rep. ... 235/95 R

Primary Examiner—Parshotam S. Lall
Assistant Examiner—V. N. Trans
Attorney, Agent, or Firm—Venable, Baetjer and Howard

[57] ABSTRACT

A travel detecting apparatus is disclosed which generates a pulse signal in response to vehicle motion and detects the actual rate of vehicle travel in accordance with the pulse signal. The apparatus comprises a speed or RPM sensor coupled to an automotive transmission for generating a first pulse signal representative of the vehicle speed or RPM, a tire-size setting switch for setting tire information relating to the dimensions of the tires of the vehicle, and a CPU for frequency converting the first pulse signal in response to the tire information to generate a second pulse and for detecting the rate of vehicle travel in accordance with the second pulse signal.

9 Claims, 4 Drawing Sheets

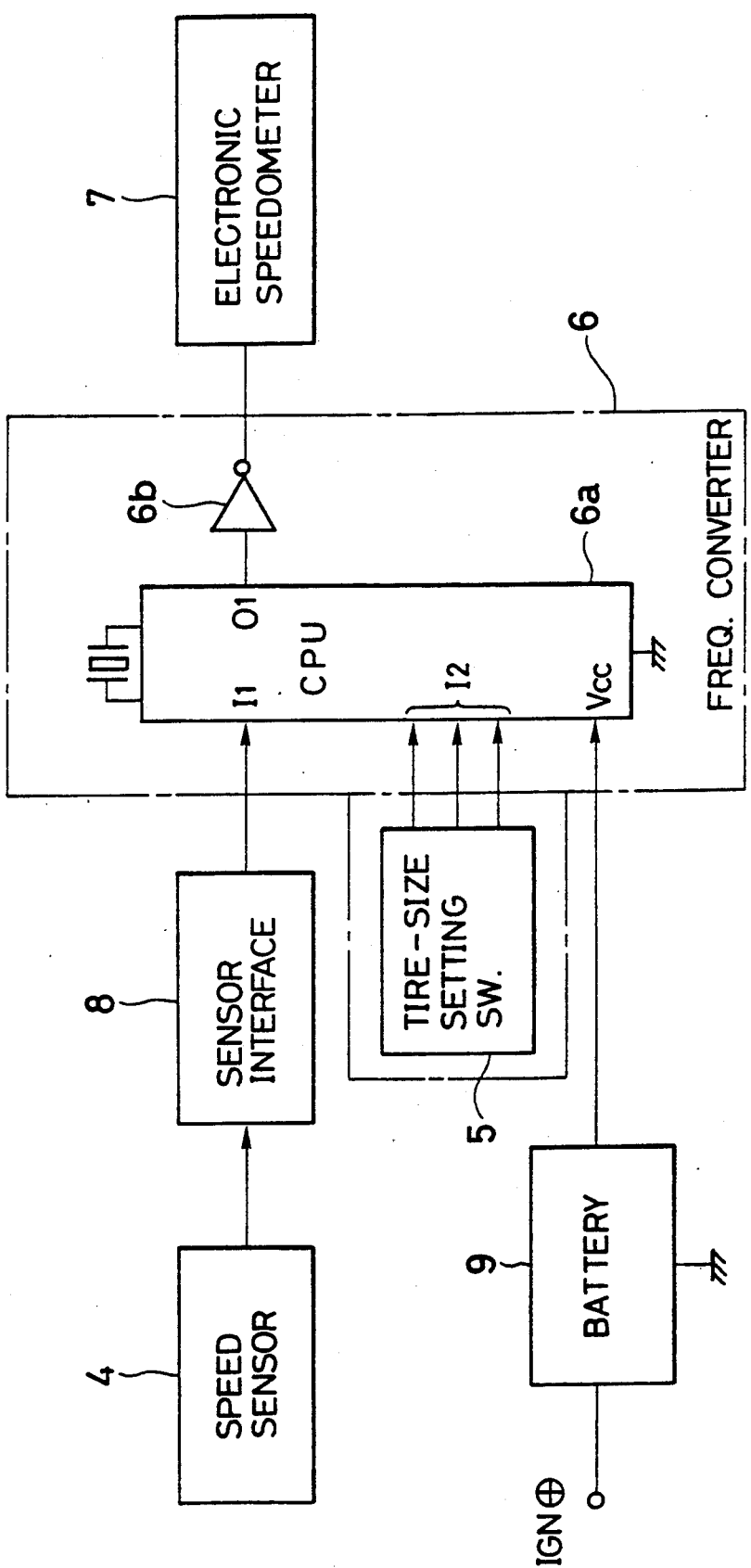

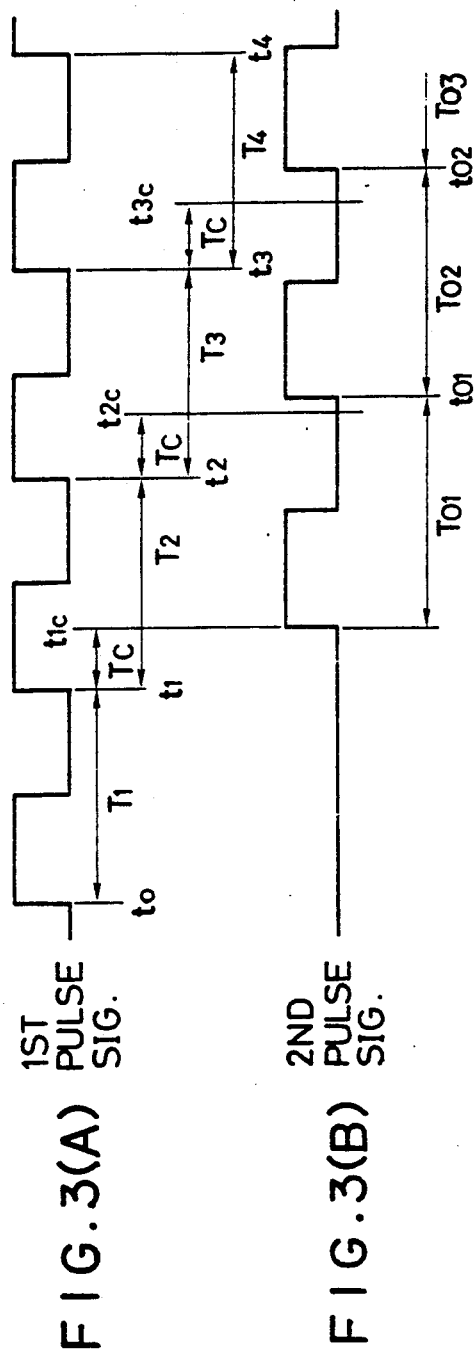
FIG. 3(A) 1ST PULSE SIG.
FIG. 3(B) 2ND PULSE SIG.
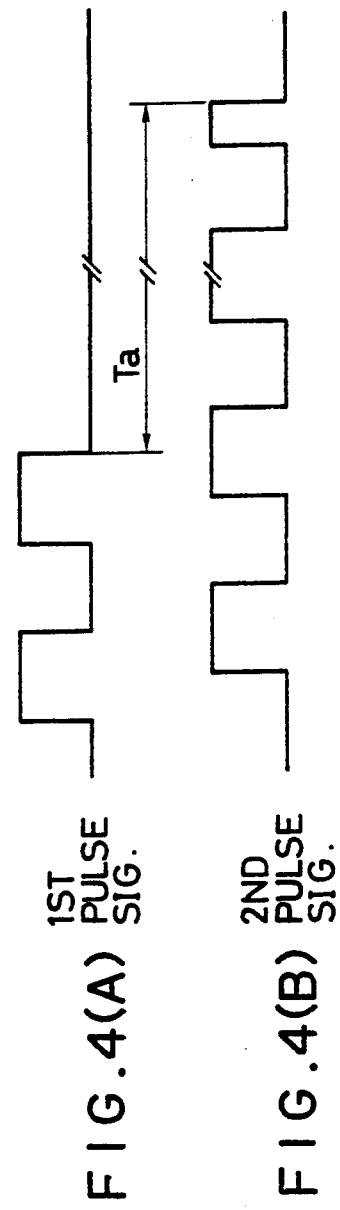
FIG. 4(A) 1ST PULSE SIG.
FIG. 4(B) 2ND PULSE SIG.

TRAVEL DETECTING APPARATUS

This application is a continuation of application Ser. No. 253,184, filed Oct. 4, 1988 now abandoned.

BACKGROUND OF THE INVENTION

1. Field of the Invention

The present invention relates to a travel detecting apparatus for detecting travel variations of a vehicle such as a motor vehicle in accordance with pulses generated in response to the travel of the vehicle.

2. Description of the Prior Art

A conventional travel detecting apparatus is constructed so that pulse signals are generated by a sensor connected to an automotive transmission. A cycle (frequency) of the pulse signals is varied in response to the rotation of the transmission, so that the number of revolutions per minute (RPM) or travelled distance may be detected by the measurement of the cycle of the pulse signals.

In the conventional travel detecting apparatus, even if the pulse signals of the same cycle would be produced exactly in accordance with RPM of the transmission, there would be errors in accordance with a diameter of tires which would be changed, so that the indicated travelled distance would be different from the actual travelled distance or an indicated speed of the vehicle would be different from the actual speed. For this reason, it is necessary to provide a speedometer or an odometer (travel meter) in accordance with the diameter of the tires. In order to commonly use indicators such as a speedometer or an odometer for different tire diameters, it is necessary to change a coupling gear ratio of a sensor relative to the transmission. In any case, to meet these requirements, it is necessary to increase the number of the mechanical or electric parts.

SUMMARY OF THE INVENTION

In view of the above-noted defects, an object of the invention is to provide a vehicle travel detecting apparatus that is capable of outputting pulse signals having a frequency in correspondence with the actual travel changed due to the tire diameter, so as to detect the vehicle travel with such pulse signals, thereby minimizing or reducing the number of the mechanical or electrical parts at a low cost.

In order to achieve this and other objects, according to the present invention, there is provided a travel detecting apparatus which comprises travel pulse generating means for generating a first pulse signal in response to the travel of a vehicle, setting means for setting correction data in accordance with a diameter of tires, frequency changing means for frequency converting said first pulse signal in response to the correction data, thereby generating a second pulse signal, and detection means for detecting the vehicle travel in accordance with said second pulse signal.

BRIEF DESCRIPTION OF THE DRAWINGS

In the accompanying drawings:

FIG. 2 is a block diagram showing an embodiment of the invention;

FIGS. 3(a) and 3(b) are timing charts showing waveforms of first and second pulse signals shown in FIG. 1, respectively;

FIGS. 4(a) and 4(b) are timing charts showing waveforms of the first and second pulse signals for illustrating the detection of the existence of the first pulse signal.

DESCRIPTION OF THE PREFERRED EMBODIMENTS

Figure 1:
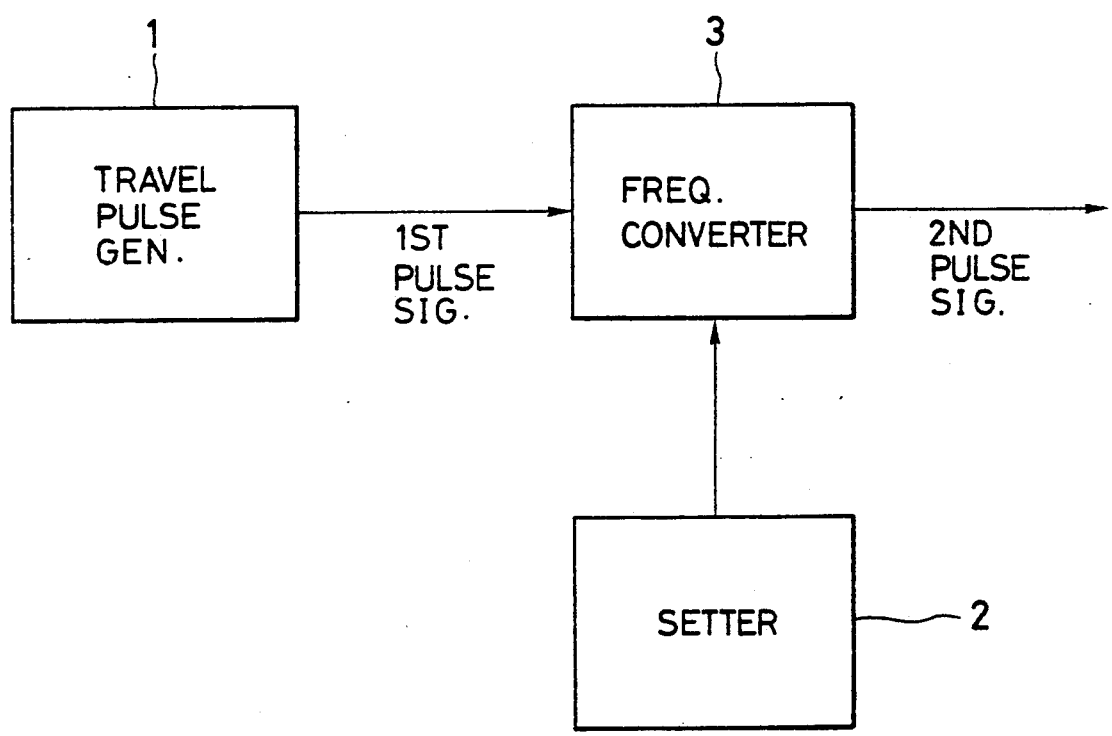
FIG. 1 is a block diagram showing a basic structure according to the invention.

As shown in FIG. 1 that is directed to a basic structure of a travel detecting apparatus in accordance with the present invention, there is provided a travel detecting apparatus which comprises a travel pulse generating means for generating a first pulse signal in response to the motion of a vehicle, setting means for setting correction data in accordance with a diameter of tires, frequency changing means for frequency converting the first pulse signal in response to the correction data, thereby generating a second pulse signal, and sensing means for detecting the vehicle travel in accordance with the second pulse.

With such an arrangement, the first pulse signal having a frequency in response to the vehicle speed is outputted from the travel pulse generating means 1. Also, correction data in accordance with a diameter of tires mounted on the vehicle are set by a setting means (setter) 2. Then, in the frequency converter 3, the frequency of the first pulse signal is converted in accordance with the correction data and is outputted as a second pulse signal in response to the actual vehicle travel. In accordance with the second pulse signal, the actual vehicle travel (travelled speed and vehicle speed) may be detected in conformity with the tire diameter.

Referring now to FIG. 2, it is understood that a frequency converter 6 is made up of a CPU (central processing unit) 6a and a buffer 6b connected to an output port 01 of CPU 6a. A speed sensor 4 coupled to an automotive transmission is connected through an interface 8 to an input port I1 of CPU 6a. A tire-size setting switch (whose details of structure and function are obvious for those skilled in the art) is connected to an input port I2 for setting a diameter of the tires. Also, an electric supply or automotive battery 9 is connected to an electric source terminal Vcc of CPU 6a. Furthermore, the output terminal of the output buffer 6b is connected to an indicator 7 such as an electronic speedometer and/or an odometer. It should be noted that the speed sensor 4, the setting switch 5 and the frequency converter 6 correspond to travel pulse generator 1, the coefficient setting means (setter) 2 and the frequency converter 3 shown in FIG. 1, respectively.

The operation of the foregoing arrangement will now be described. First of all, the correction data (i.e., coefficient for correction) are set by operating the setting switch 5 in order to correspond to the diameter of tires mounted on the automotive vehicle in advance. When, under this condition, the vehicle has travelled, the first pulse signal will be generated in response to the RPM of the transmission from the speed sensor 4. The first pulse signal is inputted into the input port I1 of CPU 6a through the sensor interface 8. On the other hand, the information of the tires mounted on the vehicle have been inputted into the input port I2 by the setting switch 5. Then, in accordance with the correction data, the inputted pulse signal is converted into a pulse signal having a frequency that corresponds to the actual vehicle speed. The pulse signal processed with respect to the frequency is outputted as a second pulse signal into the output port 01 and is supplied to the indicator 7 through the output buffer 6b. In the indicator 7, the second pulse signal is used therein to indicate the vehicle speed and the totally travelled distance.

The process for converting the first pulse signal and the output from the setting switch 5 into the frequency signal corresponding to the actual vehicle speed will now be described. The converting process may include one of the following two processes, for instance.

(1) The frequency of the first pulse signal outputted from the speed sensor 4 corresponding to the rotational speed of the transmission is known in advance in the case where there is no need to correct the tire diameter when the standard tires are used. The frequency of the second pulse signal corresponding to the actual vehicle speed given to the indicator or the like with respect to the first pulse signal frequency based upon the standard tire diameter is known in advance, assuming the tire diameter as a parameter. The frequency data of the output pulse signals corresponding to the actual vehicle speed relative to the frequency data of the input pulse signals from the speed sensor 4 for every tire diameter are stored in advance as a data table into an RAM and/or an ROM of CPU 6a. The correction data corresponding to the actual diameter of the tires mounted on the vehicle are selected by the operation of the setting switch 5. As a result, in accordance with the data, the table corresponding to the tire diameter is selected from the respective tables stored in RAM and/or ROM. During the travel of the vehicle, the frequency of the pulse signals outputted from the speed sensor 4 is detected by CPU 6a. The selected table is searched to thereby output the second pulse signal frequency corresponding to the actual vehicle speed in conformity with the frequency into the indicator 7.

(2) As described above, the first pulse signal frequency of the speed sensor 4 corresponding to RPM of the transmission is already known with respect to the standard tire diameter. Also, the correction coefficients for converting the first pulse signal frequency in accordance with the tire diameter is known in correspondence with the tire diameter. Therefore, the correction data are inputted into CPU 6a as the correction data from the setting switch 5, so that the equation, $f2 = K \cdot f1$ is given where K is the correction coefficient, f1 is the first pulse signal frequency and f2 is the second pulse signal frequency. Then, the first pulse signal frequency from the speed sensor 4 is detected in CPU 6a, and the above-described calculation is performed using the correction coeffient K to calculate the value of the second pulse signal frequency.

The mutual timing between the first and second pulse signals will be explained with reference to FIGS. 3(a) and 3(b). The first pulse signal (input pulse signal) is in the form of a rectangular signal as shown in FIG. 3(a). The pulse signals are generated from a time t0 with cycles of T1, T2, ... in this order. The CPU 6a measures the respective pulse signal cycles of T1, T2 ... and a process such as these described in the paragraphs (1) and (2) is performed for calculating the second pulse signal cycles T01, T02, ..., representative of the actual vehicle speed corresponding to the respective cycles of the second pulse signals. The second pulse signal cycles T01, T02, ... thus calculated are in the form of rectangular signals of duty 50% as shown in FIG. 3(b).

Assuming that Tc is the period needed for calculating the above-processes in the CPU 6a, the second pulse signal cycles T01, T02, ... corresponding to the respective first pulse signal cycles T1, T2, ... are calculated into times t1c, t2c, ... in addition to the calculation period Tc from the completion times t1, t2, ... of the respective cycles T1, T2, ... At this time, in the case where at the second pulse pulse signal cycle corresponding to the termination time of the prior one at each calculation completion time t2c, t3c (the respective cycles T01, T02, ... are outputted at the times T2c, T3c, ... in FIGS. 3(a) and (b)), the next second pulse signal cycles are outputted at half the pulse completion times t01, t02 of the second pulse cycles. Namely, at the time tnc, if the second pulse signal T0(n−1) is outputted, the second pulse signal of cycle T0n is outputted from the completion time t0(n−1) of the cycle T0(n−1).

Figure 5:
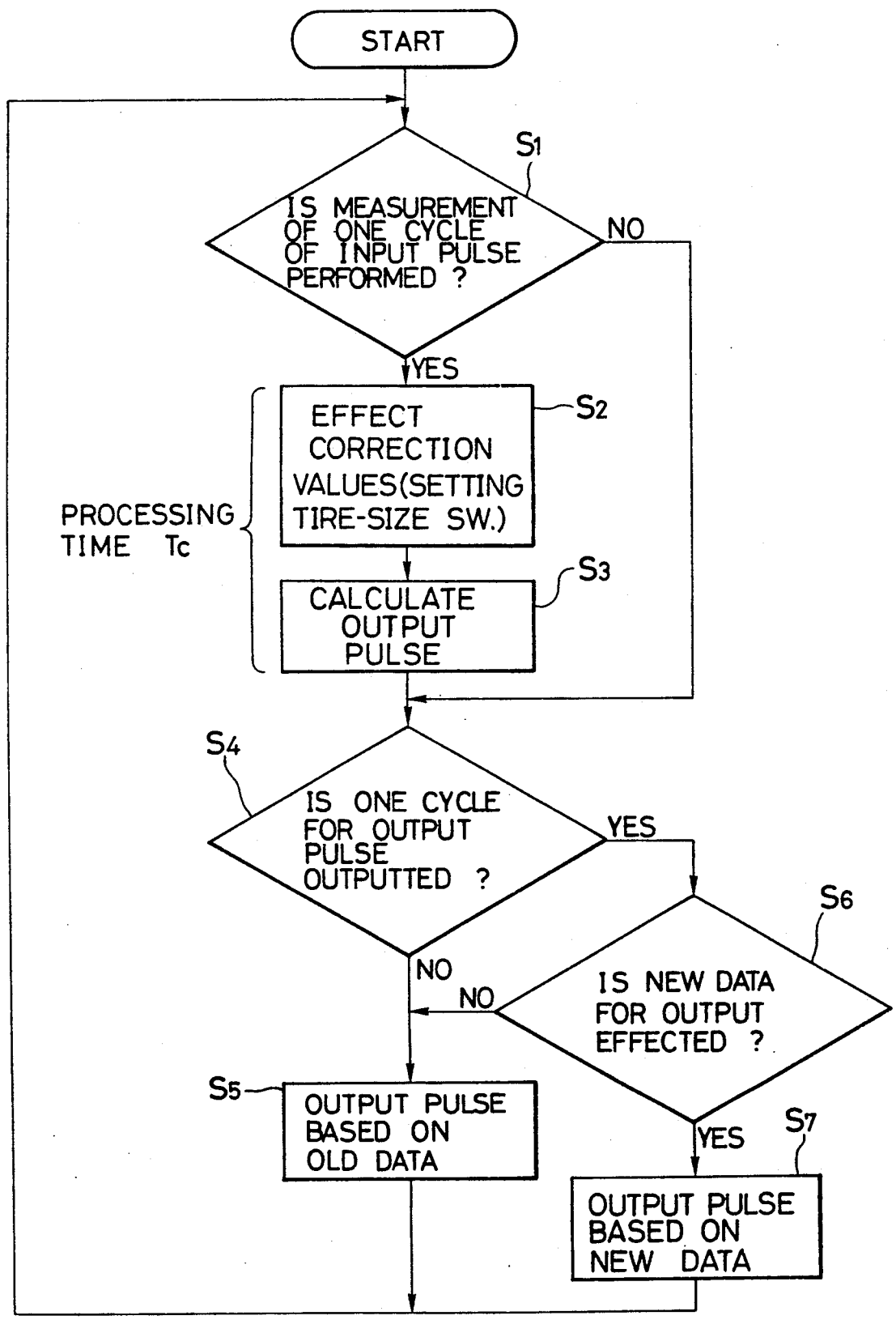
FIG. 5 is a flow chart showing the processing of CPU shown in FIG. 2.

The processes performed in CPU 6a will be explained with reference to the flow chart of FIG. 5 and the timing charts of FIGS. 3(a) and 3(b). In FIG. 5, in first step S1, a single cycle Tn of the first pulse signal (input pulse signal) is measured, and it is judged whether the measurement of the cycle is completed or not. Upon the completion of the measurement of the single cycle, correction data set by the setting switch 5 in advance are effected in step S2. In step S3, the second pulse signal cycle T0n is calculated corresponding to the first pulse signal cycle Tn measured in the step S1 through one of the above-described frequency converting processes (1) and (2). The calculation period needed for processing the steps S2 and S3 in CPU 6a is represented by the calculation processing period Tc.

Subsequently, in step S4, it is judged whether or not the cycle T0(n−1) of the prior second pulse signal (output pulse) is outputted at the time tnc when the calculation processing time Tc has lapsed at the termination time tn of the first pulse signal cycle Tn measured in step S1. If No, in step S5, the prior cycle T0(n−1) is continuously outputted and the process is returned back to S1. Also, in the case where the completion time t0(n−1) of the prior cycle T0(n−1) is prior to tnc, that is, the cycle T0(n−1) has been already lapsed at the completion time t0(n−1) prior to the time tnc, it is judged in step S6 whether the new output data are full or not. If not, a pulse of the prior cycle T0(n−1) is again outputted in step S5. If Yes, in step S7, the above described cycle T0n pulse is outputted is a new second pulse signal and the process is returned back to step S1.

Incidentally, in order to detect the absence of the first pulse signal, the rising or lowering of the first pulse signal in FIG. 4(a) is detected. In the case where the first pulse signal is not detected within a predetermined time period Ta from the detection time, the output of the second pulse signal is interrupted as shown in FIG. 4(b).

As described above, according to the present invention, since the frequency of the pulse signals generated in the travel of the vehicle in accordance with the tire diameter is converted for correction, it is possible to reduce or minimize the detection error of the vehicle travel due to the tire diameter difference. Also, it is unnecessary to prepare new gear ratios of the transmission or various other indicators. According to the invention, it is possible to perform the correction while using the common indicator or the common gear ratio, without increasing the number of mechanical and electronic parts. This will lead to economical advantage.

What is claimed is:

1. An apparatus for periodically detecting and indicating the rate of motion of a vehicle, comprising:
   means for generating a first pulse signal in response to motion of a vehicle;
   means for measuring a single cycle of the first pulse signal and determining whether the measurement of the single cycle is complete;
   memory means for storing a variety of data relating to tire diameter;
   means for selecting and outputting correction data in accordance with a diameter of a tire of the vehicle from said memory means after a single cycle of the first pulse signal has been measured;
   means for calculating a second pulse signal by calculating a single cycle of the second pulse signal based on a corresponding single cycle of the first pulse signal and the outputted correction data;
   means for determining whether a single cycle of the second pulse signal has been outputted;
   means for checking a single cycle of the second pulse signal to determine whether the single cycle is full;
   means for outputting a single cycle of the second pulse signal after the single cycle has been checked and determined to be full; and
   means for indicating a new rate of vehicle motion in accordance with the outputted single cycle of the second pulse signal.

2. An apparatus according to claim 1, wherein said new rate of vehicle is a vehicle speed.

3. An apparatus according to claim 1, wherein said new rate of vehicle is a traveled distance.

4. An apparatus for periodically detecting and indicating the rate of motion of a vehicle, comprising:
   means for generating a first pulse signal in response to motion of a vehicle;
   means for measuring a single cycle of the first pulse signal and determining whether the measurement of the single cycle is complete;
   memory means for storing a variety of data relating to tire diameter;
   means for selecting and outputting correction data in accordance with a diameter of a tire of the vehicle from said memory means after a single cycle of the first pulse signal has been measured;
   means for calculating a second pulse signal by calculating a single cycle of the second pulse signal based on a corresponding single cycle of the first pulse signal and the outputted correction data;
   means for determining whether a single cycle of the second pulse signal has been outputted;
   means for checking a single cycle of the second pulse signal to determine whether the single cycle is full;
   means for outputting a single cycle of the second pulse signal after the single cycle has been checked and determined to be full;
   means for outputting a previously-outputted single cycle of the second pulse signal after a single cycle of the second pulse signal has been checked and determined not to be full; and
   means for indicating an old rate of vehicle motion in accordance with the outputted previously-outputted single cycle of the second pulse signal.

5. An apparatus according to claim 4, wherein said old data of vehicle is a vehicle speed.

6. An apparatus according to claim 4, wherein said old data is a traveled distance.

7. An apparatus for periodically detecting and indicating the rate of motion of a vehicle, comprising:
   means for generating a first pulse signal in response to motion of a vehicle;
   means for measuring a single cycle of the first pulse signal and determining whether the measurement of the single cycle is complete;
   means for calculating a second pulse signal by calculating a single cycle of the second pulse signal based on a corresponding single cycle of the first pulse signal;
   means for determining whether a single cycle of the second pulse signal has been outputted;
   means for checking a single cycle of the second pulse signal to determine whether the single cycle is full;
   means for outputting a previously-outputted single cycle of the second pulse signal after a single cycle of the second pulse signal has been checked and determined not to be full; and
   means for indicating an old rate of vehicle motion in accordance with the outputted previously-outputted single cycle of the second pulse signal.

8. An apparatus according to claim 7, wherein said old rate of vehicle is vehicle speed.

9. An apparatus according to claim 7, wherein said old date is a traveled distance.

* * * * *